J. M. DEMENT.
AUTOMOBILE LOCK.
APPLICATION FILED JUNE 19, 1917.

1,369,886.

Patented Mar. 1, 1921.

Inventor
J. M. Dement
By Chandler & Chandler
Attorney

Witness

UNITED STATES PATENT OFFICE.

JOHN M. DEMENT, OF INDIAN HEAD, MARYLAND.

AUTOMOBILE-LOCK.

1,369,886. Specification of Letters Patent. Patented Mar. 1, 1921.

Application filed June 19, 1917. Serial No. 175,647.

*To all whom it may concern:*

Be it known that I, JOHN M. DEMENT, a citizen of the United States, residing at Indian Head, in the county of Charles, State of Maryland, have invented certain new and useful Improvements in Automobile-Locks; and I do hereby declare the following to be a full, clear, and exact description of the invention, such as will enable others skilled in the art to which it appertains to make and use the same.

This invention relates to locks for automobiles.

The object of this invention is to provide a novel lock for securing the steering mechanism of an automobile, so that the latter may not be removed from a parked or stored position. To this end, I have provided a locking device which may be inserted in the steering knuckle of an automobile in order to prevent the operation of the steering spindles.

With the above objects in view, and such others relating to the details of construction as may hereinafter appear, my invention will now be fully set forth and described, reference being had to the accompanying drawings.

In the drawings:—

Figure 1:
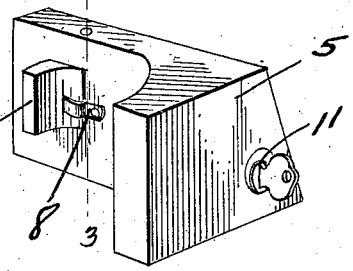
Figure 1 is a perspective view of the lock.
Figure 2:
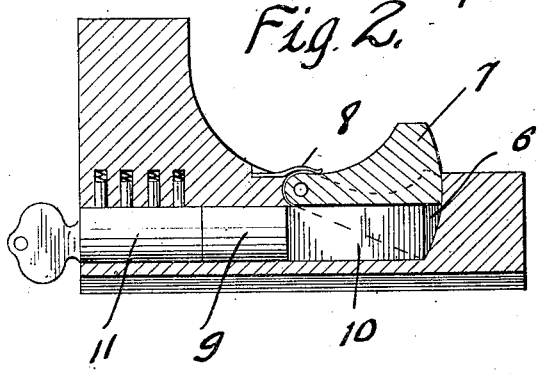
Fig. 2 is a horizontal section therethrough.
Figure 3:
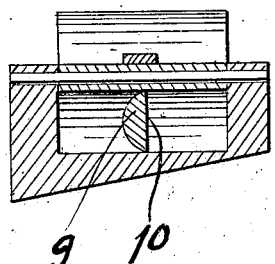
Fig. 3 is a section on line 3—3 of Fig. 1.
Figure 4:
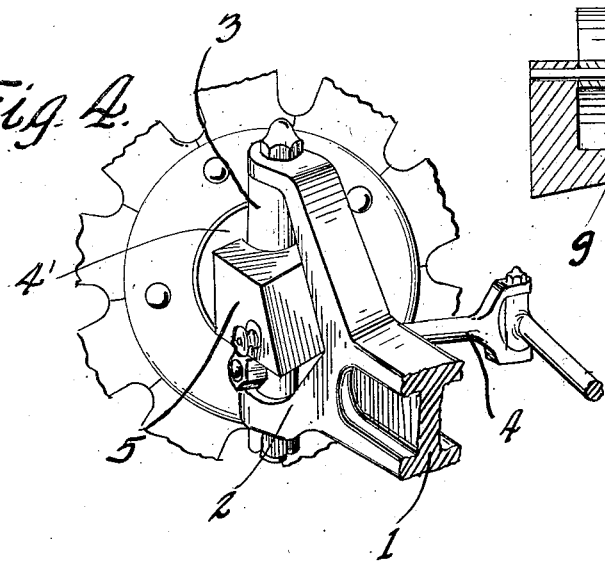
Fig. 4 is a perspective view showing the application of the device.

Referring more particularly to the drawings, 1 represents the axle which terminates in the knuckle 2 the latter including the vertical steering spindle head 3. Projecting rearwardly from the spindle head 3 is the usual steering arm 4. In many automobiles an appreciable amount of space is left between the stationary part of the knuckle 2 and the spindle head 3, so that a body may be inserted therebetween.

Therefore, in carrying out my invention, I have provided an L-shaped block 5, which will practically fill the space which is left between the axle and the spindle. The elongated portion of the block 5 is received between the knuckle 2 and the head 3, while the shorter length thereof passes around the front of the head and overlies the side of the latter so that its free end may strike against the wheel spindle 4' when the wheels of the automobile have been cramped in one direction out of the straightaway position. Thus, following a usual practice, an operator will cramp the wheels of his machine against the curb stone when leaving the car, so that the steering arms are thrown a little to one side, while the wheel spindles stand at an angle to the axle. In this position, the block 5 may be inserted to its full extent. Within the body of the elongated portion of the block 5, is cut a recess 6 within which is pivoted a second block 7 whose conformation is such that when swung outwardly it will form a complement to the shorter arm of the block, and embracing the opposite side of the head 3 from that engaged by said shorter arm, will be thereby locked around said head. In order to removably lock the second block 7 in its extended position, against the action of a spring 8 which is secured to the face of the block 5 and bears against the block 7, I have mounted longitudinally in the block 5 a bolt 9 whose forward end has a cam face 10, and whose opposite end is connected to a cylinder lock 11 so that a key is necessary to rotate the bolt. The cam face 10 is formed by cutting away the bolt 9 into a recess which will permit the retraction of the block 7, while the rotation of the bolt 9 will throw the rounded portion of the end thereof against the rear face of the block 7 and throw the latter out into locking position. The bolt 9 may be rotated only when the key is inserted in the lock 11, either into its locking or releasing position. And, obviously, when the key is removed after the device has been inserted and locked into a steering knuckle it will be impossible for unauthorized parties or those not provided with a key to steal the car or to move it, even by towing it away.

What I claim as my invention is:—

A locking device for automobiles, comprising in combination, a block having a fixed shoulder at one end, a pivoted shoulder recessed into the block at its opposite end, the insertion of the block between the end of an axle and the steering spindle of an automobile preventing the rotation of the spindle, a locking bolt extending through the block and operative to lock the pivoted shoulder in extended position, said pivoted shoulder preventing the retraction of the block when in its extended position, and a key controlled mechanism associated with the locking bolt.

In testimony whereof, I affix my signature in the presence of two witnesses.

JOHN M. DEMENT.

Witnesses:
CLAYTON H. FOWLER,
GEORGE W. PATTERSON.